United States Patent
Zhou et al.

(10) Patent No.: US 10,291,896 B2
(45) Date of Patent: May 14, 2019

(54) DISPLAY CONTROL METHODS AND APPARATUSES AND DISPLAY DEVICES

(71) Applicant: Beijing Zhigu Rui Tuo Tech Co., Ltd, Beijing (CN)

(72) Inventors: Liang Zhou, Beijing (CN); Lin Du, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 288 days.

(21) Appl. No.: 15/167,844

(22) Filed: May 27, 2016

(65) Prior Publication Data

US 2016/0353075 A1    Dec. 1, 2016

(30) Foreign Application Priority Data

May 28, 2015    (CN) .......................... 2015 1 0282627

(51) Int. Cl.
| | | |
|---|---|---|
| H04N 13/00 | (2018.01) | |
| H04N 13/04 | (2006.01) | |
| H04N 13/128 | (2018.01) | |
| H04N 13/344 | (2018.01) | |
| H04N 13/398 | (2018.01) | |

(52) U.S. Cl.
CPC ......... *H04N 13/128* (2018.05); *H04N 13/344* (2018.05); *H04N 13/398* (2018.05)

(58) Field of Classification Search
CPC ............. H04N 13/0022; H04N 13/044; H04N 13/0497
See application file for complete search history.

(56) References Cited

U.S. PATENT DOCUMENTS

| | | | |
|---|---|---|---|
| 5,841,439 A | 11/1998 | Pose et al. | |
| 9,328,997 B2* | 5/2016 | Kennedy | ............ H04N 5/23293 |
| 2013/0128230 A1 | 5/2013 | Macnamara | |
| 2013/0250133 A1* | 9/2013 | House | .................... H04N 5/232 348/208.2 |
| 2013/0285885 A1 | 10/2013 | Nowatzyk et al. | |
| 2014/0003762 A1 | 1/2014 | Macnamara | |
| 2014/0233853 A1* | 8/2014 | Fransson | .................. G06K 9/60 382/173 |
| 2014/0268356 A1 | 9/2014 | Bolas et al. | |
| 2014/0361977 A1 | 12/2014 | Stafford et al. | |

(Continued)

FOREIGN PATENT DOCUMENTS

| | | |
|---|---|---|
| CN | 102937745 A | 2/2013 |
| CN | 104246578 A | 12/2014 |
| CN | 204087188 U | 1/2015 |

OTHER PUBLICATIONS

Office Action for Chinese Application No. 201510282627.5, dated Sep. 3, 2018.

*Primary Examiner* — Kate H Luo
(74) *Attorney, Agent, or Firm* — Amin, Turocy & Watson, LLP (57) ABSTRACT

Various display control methods and apparatuses and various display devices are provided. A method comprises: acquiring movement information of a display device; adjusting a display image distance of at least one display object according to the movement information; and controlling the display device to display the at least one display object at least according to the adjusted display image distance. A visual effect and user experience can thereby be improved.

34 Claims, 4 Drawing Sheets

(56) References Cited

U.S. PATENT DOCUMENTS

| | | | |
|---|---|---|---|
| 2015/0187115 A1* | 7/2015 | MacDonald | G06F 3/013 345/419 |
| 2015/0226969 A1* | 8/2015 | Tsukahara | H04N 5/2329 359/462 |
| 2016/0161744 A1* | 6/2016 | Kobayashi | G02B 27/017 345/8 |
| 2016/0161833 A1* | 6/2016 | Watanabe | B60K 35/00 345/7 |

* cited by examiner

DISPLAY CONTROL METHODS AND APPARATUSES AND DISPLAY DEVICES

RELATED APPLICATION

The present application claims the benefit of priority to Chinese Patent Application No. 201510282627.5, filed on May 28, 2015, and entitled "Display Control Methods and Apparatuses and Display Devices", which application is hereby incorporated into the present application by reference herein in its entirety.

TECHNICAL FIELD

The present application relates to the technical field of display, and, for example, to various display control methods and apparatuses and various display devices.

BACKGROUND

With continuous development of display technologies, types of display devices are developed continuously, such as continuous development of novel display devices such as a 3D display, a near-to-eye display device and a light field display, and diversified application requirements are met.

In certain situation, movement of the display devices affects a visual effect of its displayed content, for example, movement of the display devices possibly causes lag, judder, and trailing of a displayed picture of the display device, a poor display effect is caused and the like.

SUMMARY

The following briefly describes the present application, so as to provide a basic understanding of some aspects of the present application. It should be understood that, the brief description is not an exhaustive description of the present application. The description is neither intended to determine key or important parts of the present application, nor intended to limit the scope of the present application. An example, non-limiting objective thereof is merely to give some concepts in a simplified manner as a preface for more detailed description hereinafter.

The present application provides various display control methods and apparatuses and various display devices.

In a first aspect, an example embodiment of the present application provides a display control method, comprising:

acquiring movement information of a display device;

adjusting a display image distance of at least one display object according to the movement information; and controlling the display device to display the at least one display object at least according to the adjusted display image distance.

In a second aspect, an example embodiment of the present application further provides a display control apparatus, comprising:

a movement information acquiring module, configured to acquire movement information of one display device;

a display image distance adjusting module, configured to adjust a display image distance of at least one display object according to the movement information; and a display control module, configured to control the display device to display the at least one display object at least according to the adjusted display image distance.

In a third aspect, an example embodiment of the present application also provides a near-to-eye display device, comprising:

a processor, a communication interface, a memory and a communication bus; the processor, the communication interface and the memory communicate with one another by the communication bus;

the memory is configured to store at least one command; the command causes the processor to perform following operations:

acquiring movement information of a display device;

adjusting a display image distance of at least one display object according to the movement information; and displaying the at least one display object at least according to the adjusted display image distance.

According to one or more example embodiments of the present application, a display image distance of at least one display object can be adjusted according to movement information of the display device, and the display device is controlled to display the at least one display object at least according to the adjusted display image distance, thereby the movement information of the display device is adaptively adjusted according to the display image distance of at least one display object, and a visual effect and user experience are improved.

The following describes in detail alternative embodiments of the present application with reference to accompanying drawings, to make these and other aspects of the present application more understood.

BRIEF DESCRIPTION OF THE DRAWINGS

The present application may be understood better with reference to the following description in combination with accompanying drawings, wherein a same or similar accompanying drawing mark is used in all the accompanying drawings to represent a same or similar component. The accompanying drawings together with the following detailed description are comprised in the specification and constitute a part of the specification, and are used to further illustrate alternative embodiments of the present application and explain aspects of the present application. In the accompanying drawings.

A person skilled in the art should understand that, elements in the accompanying drawings are merely shown for simplicity and clarity, and are not necessarily drawn to scale. For example, in the accompanying drawings, the size of an element may be enlarged relative to another element, so as to facilitate enhancing an understanding of the embodiments of the present application.

DETAILED DESCRIPTION

The following will describe in details illustrative embodiments of the present application with reference to accompanying drawings. For the purpose of clear and brief description, the specification does not describe all features of practical implementation manners. However, it should be understood that, many decisions specific to the implementation manners can be made during development of any one of the practical embodiments, so as to achieve a specific objective of a developer, for example, conformance to restrictive conditions related with a system and service, wherein the restrictive conditions may vary with different embodiments.

Another point that should be noted here is, to avoid the present application from being not clearly understood due to unnecessary details, the accompanying drawings and specification merely describe apparatus structures and/or processing steps closely related to the solutions of the present application, but omit the representation and description of parts and processing that have little relation with the present application, and have been known by a person of ordinary skill in the art.

The following further describes in detail example embodiments of the present application with reference to the accompanying drawings (a same label represents a same element in several accompanying drawings) and embodiments. The following embodiments are used to describe the present application, but are not intended to limit the scope of the present application.

A person skilled in the art may understand that, terms such as "first" and "second" in the present application are merely used to distinguish different steps, devices or modules, which neither represent any specific technical meaning, nor represent a necessary logic sequence among them.

Figure 1:
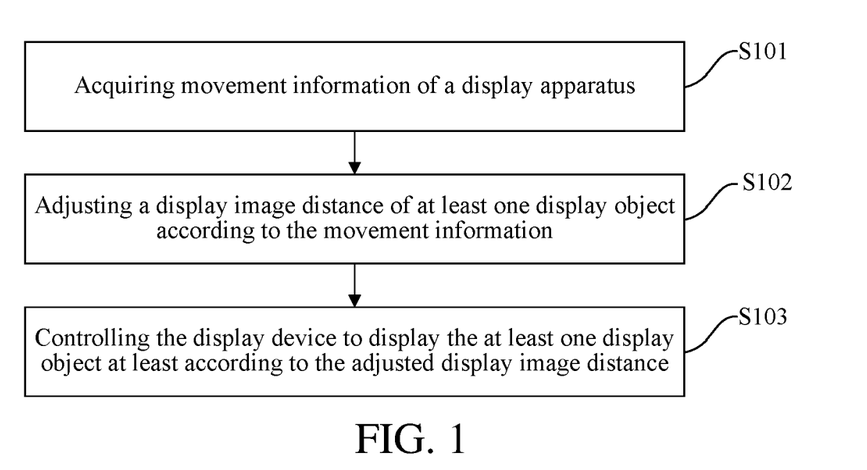
FIG. 1 is a flowchart of a display control method according to an example embodiment of the present application.

FIG. 1 is a flowchart of a display control method according to an embodiment of the present application. The display control method provided by this embodiment of the present application may be executed by certain display control apparatus, and the display control apparatus can perform display control by executing the display control method during a display application process, comprising but not limited to: display and playing of image, video and other virtual content. There is no limit to the manners in which the display control apparatus is embodied. For example, the display control apparatus may be an independent part, and the part cooperates with a display device in communication; or the display control apparatus may be a functional module integrated in a display device, which is not limited in this embodiment of the present application.

Specifically, as shown in FIG. 1, a display control method provided by this embodiment of the present application comprises:

S101: Acquiring movement information of a display device;

S102: Adjusting a display image distance of at least one display object according to the movement information; and S103: Controlling the display device to display the at least one display object at least according to the adjusted display image distance In certain situations, limited to the limitation of factors such as a display or data processing capacity and a bandwidth resource, when a display device moves, a picture displayed by the display device has certain latency, which lies in that a display object has certain lag, judder and trailing. For example, when the display device is a near-to-eye display device, the latency of the near-to-eye display device is assumed as 50 ms, a picture with resolution of 1k*1k is displayed in a field of vision (FoV) of 100 degrees, if a user wearing the near-to-eye display device turns head, a virtual image displayed by the near-to-eye display device is old data before 50 ms, in other words, deviation of about 3 degrees exists between an actual display position of the virtual image and a current deserved display position. Vision sensitivity of eyes to such deviation is related to a distance between the virtual image and the eyes, if the virtual is farther away from the eyes, perception of the eyes for such deviation is relatively weak, on the contrary, if the virtual image is closer to the eyes, perception of eyes to such deviation is stronger; for example, that is to say, by adjusting a display image distance of at least one display object, the vision perception of the eyes to the display lag and trialing phenomena of the at least one display object caused by movement information of the display device is adjusted to certain extent.

According to example embodiments of the present application, a display image distance of at least one display object can be adjusted according to movement information of the display device, and the display device is controlled to display the at least one display object at least according to the adjusted display image distance, thereby the movement information of the display device is adaptively adjusted according to the display image distance of at least one display object, and a visual effect and user experience are improved.

For example, according to an example embodiment of the present application, the vision perception of the eyes to the phenomena such as display lag, judder, and trialing of at least one display object caused by movement information of the display device is adjusted by increasing a display image distance increasing manner, and discomfort of the eyes caused by the phenomena such as display lag, judder, and trialing is favorably relieved, to cause a display quality of the at least one display object saw by the eyes to be relatively better, and further improve a viewing effect and user experience.

For another example, according to an example embodiment of the present application, an immersive visual effect and experience of the user during relative movement of the display device can be adjusted by a display image distance reducing manner.

Movement information of the display device can be generally understood as: self absolute movement information of the display device per se, for example, movement of the display device together with the head of a human body, relative movement information of the display device relative to certain reference object, for example, the relative movement information of the display device relative to at least one display object displayed by the display device, the relative movement information of the display device relative to a movement object in a situation that the head of the human body wearing the display device moves to trace at least one movement object displayed by the display device, or the like, and can be determined according to actual demands to meet diversified practical application requirements. An acquiring manner for the movement information of the display device is very flexible, for example, the movement information can be acquired by self detection of the display device, or the movement information can be acquired by other devices communicated with the display device, which is not limited in the embodiment of the present application.

After the movement information of the display device is acquired, a display image distance of the at least one display object can be adjusted according to the movement information, the adjusting of the display image distance comprises but is not limited to increasing or reducing of the original display image distance to meet diversified practical application requirements. The display image distance is a distance of an image displayed by an optical part of the display device and the optical part, the adjusting of the display image distance of the display object is equivalent to the adjusting of the distance between the image of the display object displayed by the display device and eyes. The display image distance can be very flexibly adjusted: for example, the display image distance of the same display object can be changed by adjusting optical parameters of the display device, and the optical parameters comprise but are not limited to focus length and/or refractive index of the optical part; for another example, the display object can be displayed to refocusing planes of different depths through content pretreatment of the display object; for another example, the display device can comprise different waveguide layers distributed along a depth direction, and different waveguide layers are configured to reconfigure light field information on the planes of different depths, each waveguide layer comprises a plurality of beam splitters and a micro curve reflection mirror, incident light images through transmission of the waveguide layers, which is equivalent to reconfiguration of light field information of corresponding objects on the plane of specific depth, by changing the waveguide layer where the imaging light transmits of the at least one display object, the light field information of the at least one display object can be reestablished on different depths, that is to say, the display image distance of the at least one display object is changed.

Optionally, the adjusting the display image distance of the at least one display object according to the movement information comprises: according to the movement information and refreshing capability information of the display device, determining display image distance restriction information; and adjusting the display image distance of the at least one display object according to the display image distance restriction information. In the solution, the movement information and refreshing capability information of the display device are combined to dynamically adapt to the display image distance of the at least one display object, and improve adjusting pertinence and effectiveness of the display image distance. The refreshing capability information of the display device can be shown by a refreshing rate or refreshing period of the display device, if the display device has a plurality of refreshing rates or refreshing periods, any refreshing rate or refreshing period therein (such as the currently set refreshing rate or refreshing period of the display device) can be adopted to show the refreshing capability information of the display device, or the highest refreshing rate or shortest refreshing period is used as the refreshing capability information of the display device, which is specifically determined according to application requirements, and not limited by the embodiment of the present application. An image of the display object through the display device is positioned on a display screen of the display device, or certain position in front of or behind the display screen of the display device; the display object corresponds to certain static image, or the display object corresponds to certain animation or the like.

The refreshing rate of the display device is assumed as t (refreshing period is 1/t), a movement speed of the display device relative to certain display object is v, then the movement distance of the display device relative to the display object in a refreshing period is $s_0 = v/t$, if the display device moves together with the head of a human body, which is equivalent to that the display object moves in the opposite direction of a display, and movement distance is $$s_d = R\frac{v}{t},$$

wherein, $$R = \frac{f}{d_0}$$

is a zooming factor, f is equivalent focal length of the display object through the display device, and $d_0$ is the distance between an image of the display object through the display device and eyes (for example, surfaces of pupils of the eyes). Generally, under the condition of given refreshing rate and display image distance of the display device, a relative movement distance of the display object on the display is smaller than certain threshold value C, (the threshold value can be determined according to eye visual characteristics, user visual characteristics, empirical data or the like) to ensure that the eyes cannot see relative movement of the display object, that is to say, in the movement process of the display device, the display object saw by the eyes has no lag, judder or trailing:

$$s_d = R\frac{v}{t} = \frac{fv}{d_0 t} \le C \qquad (1)$$

It can be acquired by transforming the formula (1) that:

$$d_0 \ge \frac{fv}{tC} \qquad (2)$$

The display image distance of the display object is:

$$d_s = d_0 - d_e \qquad (3)$$

Wherein, $d_s$ is a display image distance of the display object, $d_e$ is the distance between the eyes and the display device (for example, the distance between pupil surfaces of the eyes and a lens optical center of an image of the display object affected by the display device). Display image distance restriction information can be obtained according to formulas (2) and (3):

$$d_s \ge \frac{fv}{tC} - d_e \qquad (4)$$

The display image distance of the corresponding display object can be adjusted according to the display image distance restriction information, for example, if wanting to reduce the phenomena such as display judder and trailing possibly caused by the movement information, an actual display image distance of the display object may be increased to be larger than a lower limit in formula (4); of course, in certain situations, if wanting to show the phenomena such as display judder and trailing possibly caused by the movement information, an actual display image distance of the display object may be increased to be smaller than the lower limit in formula (4).

Optionally, before adjusting the display image distance of the at least one display object according to the movement information, the display control method also comprises:

determining expected refreshing information of the display device corresponding to the movement information; and determining the expected refreshing information to exceed the refreshing capability information of the display device. The solution is equivalent to determination of weakening or offsetting the refreshing information (namely expected refreshing information) of the display device required for eye discomfort possibly generated by movement information of the display device, for example, the formula (2) can be used to determine expected refreshing information (expected refreshing rate or period), which is used as a triggering factor for adjusting the display image distance or not. If the expected refreshing information exceeds the refreshing capability information of the display device, for example, the expected refreshing information exceeds the current or maximal refreshing rate of the display device, it is indicted to certain extent that the display device incompetently supports smooth display of the at least one display object during relative movement, in the situation, the display image distance of the at least one display object is correspondingly adjusted according to the movement information, and corresponding display control is performed to relieve to certain extent or eliminate visual discomfort of the eyes, and improve a viewing effect and user experience.

Further, the display control method further comprises: responding to the expected refreshing information to not exceed the refreshing capability information of the display device, and adjusting the refreshing information of the display device according to the refreshing capability information and the expected refreshing information, and the refreshing information comprises but is not limited to refreshing rate or period. If the expected refreshing information does not exceed the refreshing capability information of the display device, it is indicated that through current refreshing information adjusting of the display device within the refreshing capability range of the display device, probability that the display device smoothly displays the at least one display object is larger, for example, although the current refreshing rate of the display device is smaller than the expected refreshing information, the refreshing rate of the display device can be improved to cause the increased refreshing rate of the display device to be larger than or equal to or close to the expected refreshing information as much as possible, hence, the refreshing rate of the display device is simply adjusted to meet the application requirement on smooth display of the at least one display object relative to eye vision, above visual discomfort of the eyes is relieved to certain extent or eliminated, a viewing effect and user experience are improved, the solution is simple and easy to realize and solution universality is improved.

Optionally, before adjusting the display image distance of the at least one display object according to the movement information, the display control method also comprises: determining allowable movement information corresponding to the refreshing capability information of the display device; and determining the movement information to exceed the allowable movement information. The solution is equivalent to determination of the allowable movement information of the display device, not causing obvious discomfort to eye vision, supported by the refreshing capability information of the display device, for example, the formula (2) can be used to determine the allowable movement information of the display device corresponding to the current refreshing rate of the display device, or the allowable movement information of the display device corresponding to the maximal current refreshing rate of the display device, which is used as a triggering factor of adjusting the display image distance or not. If the movement information of the display device exceeds the allowable movement information, it is indicated to certain extent that the display device incompetently supports the smooth display of the at least one display object during relative movement, in this situation, the display image distance of the at least one display object is correspondingly adjusted according to the movement information, and corresponding display control is performed to relieve to certain extent or eliminate visual discomfort of the eyes, and improve a viewing effect and user experience.

Further, the display control method also comprises: responding to the movement information to no exceed the allowable movement information, and adjusting the refreshing information of the display device according to the refreshing capability information, and the refreshing information comprises but is not limited to refreshing rate or period. If the movement information of the display device does not exceed the allowable movement information, it is indicated that through current refreshing information adjusting of the display device within the refreshing capability range of the display device, probability that the display device smoothly displays the at least one display object is larger, for example, although the current refreshing rate of the display device is smaller than the expected refreshing information, the refreshing rate of the display device can be improved to cause the increased refreshing rate of the display device to be larger than or equal to or close to the expected refreshing information as much as possible, hence, the refreshing rate of the display device is simply adjusted to meet the application requirement on smooth display of the at least one display object relative to eye vision, above visual discomfort of the eyes is relieved to certain extent or eliminated, a viewing effect and user experience are improved, the solution is simple and easy to realize and solution universality is improved.

After the adjusted display image distance of the at least one display object is determined, controlling the display device to display the at least one display object at least according to the adjusted display image distance. Optionally, the controlling the display device to display the at least one display object at least according to the adjusted display image distance, comprises: controlling the display device to display the at least one display object in a zooming manner according the adjusted display image distance. In the solution, the adjusting of the display image distance in a depth direction and the zooming display of the display object are combined, which is favorable for fully using eye visual characteristics to weaken as much as possible or eliminate visual discomfort of the eyes caused by display change in the depth direction.

Specifically, adjusting of the display image distance is equivalent to increasing or reducing of a display distance in the depth direction, if the change of the display image distance of the at least one display object is not large or the user does not mind the change of the display image distance relative to the discomfort caused by the eye vision, the at least one display object is adjusted according to the adjusted display image distance. But, in certain situations, further adjusting is required to relieve or even eliminate the discomfort of the eye vision possibly caused by the change of the display image distance, for example, if the change of the display image distance of the at least one display object is large or in practical application, the discomfort of eye vision caused by the change of the display image distance is hoped to be reduced as much as possible or eliminated, optionally, the zooming display of the at least one display object can be combined to adjust a visual feeling to cause that although the display device displays one or more display objects in a farther or closer manner before the display device moves, the user eyes cannot feel such change in the depth direction, and thereby the discomfort of the user vision caused by the display change in the depth direction is weakened as much as possible or eliminated.

(1) In an example embodiment, the adjusted display image distance of the display object is larger than the display image distance before the display object is adjusted. In the solution, a manner of display the at least one display object in a farther manner is adopted to weaken or even eliminate the discomfort of eye vision possibly caused by movement information of the display device.

Viewed from a movement parallax principle, the sensitivity of the eyes is related to a distance between the eyes and an image saw by the eyes, for example, when a user see two static objects at 5 m and 10 m respectively, in a process that the user turns by the same angle, the relative movement distance of the object at the 10 m position seems smaller than that of the object at the 5 m position in view of the eyes, it can be seen that the eyes are insensitive to the relative movement of the object farther away from the eyes, and such relative movement is not easy to perceive, and will cause lower discomfort to the eyes; on the contrary, the eyes have higher resolution for the object closer to the eyes, and if the closer object relatively moves, the eyes can easily perceive such movement and feel uncomfortable. For this purpose, in the solution, the display image distance of the at least one display object is increased according to movement information of the display device, the at least one display object is arranged at a farther position to cause that the at least one display object displayed by the display device and saw by the eyes to seem to not move or slightly move in a movement process of the display device, thereby the visual discomfort possibly caused by the movement information of the display device to be reduced or even eliminated.

Viewed from an imaging formula, by increasing the display image distance of the at least one display object to correspond to the movement information of the same display device, the relative movement distance of the at least one display object relative to the display device is possibly reduced, which is equivalent to that a trailing distance possibly generated by the at least one display object is possibly reduced, and thereby viewing visual discomfort of the eyes is relieved to certain extent. The display image distances before and after the at least one display object is adjusted are assumed as $d_{s1}$ and $d_{s2}$, $d_{s2} > d_{s1}$, eye positions are unchanged, distances $d_{o1}$ and $d_{o2}$ of the display image distances away from the eyes before and after adjusting meet $d_{o2} > d_{o1}$, equivalent focal lengths of second images of the display object before and after the display device is adjusted are $f_1$ and $f_2$ respectively, the relative movement distances $s_{d1}$ and $s_{d2}$, displayed according to the display image distances before and after adjusting, of the same display object relative to the display device respectively meet:

$$s_{d1} = \frac{f_1 v}{d_{o1} t}, s_{d2} = \frac{f_2 v}{d_{o2} t}, d_{o1} < d_{o2}, f_1 \geq f_2 \quad (5)$$

Thus, it can be acquired that:

$$S_{d1} > S_{d2} \quad (6)$$

It can be seen that in the solution, the display image distance of the at least one display object is increased according the movement information of the display device, the at least one display object is displayed a farther position to slightly move in the movement process of the display device, thereby, it is favorable for relieving or even eliminating the visual discomfort possibly caused by movement information of the display device.

Further optionally, the controlling the display device to display the at least one display object in a zooming manner according to the adjusted display image distance, comprises: controlling the display device to display the at least one display object in a zooming in manner according to the adjusted display image distance. Eye visual characteristics meet a near-large far-small imaging rule, namely, the same object closer to the eyes seems larger, and the same object farther away from the eyes seems smaller. In the solution, in order to relieve to certain extent or eliminate the depth visual perception of eye vision on farther display of the at least one display object (increasing the display image distance of the at last one display object), farther display and zooming in display of the at least one display object are combined, by zooming in display of the visual effect, caused to the eyes, that the at least one display object is closer to the eyes, the visual perception in the depth direction of the eyes caused by farther display of the at least one display object is relieved to certain extent or even offset, thereby the visual discomfort possibly caused by adjusting of the display image distance is relieved or even eliminated, and it is further favorable for improving visual effect and user experience.

(2) In another example embodiment, the display image distance after the display object is adjusted is smaller than that before the display object is adjusted. In the solution, a manner of closer display of the at least one display object is used to increase visual immersion of displayed content of the display device and improve visual effect and user experience.

Further, the controlling the display device to display the at least one display object in a zooming manner according to the adjusted display image distance, comprises: controlling the display device to display the at least one display object in a zooming out manner according to the adjusted display image distance. In the solution, in order to relieve to certain extent or eliminate the depth visual perception of eye vision on closer display of the at least one display object (reducing the display image distance of the at last one display object), closer display and zooming out display of the at least one display object are combined, by zooming out display of the visual effect, caused to the eyes, that the at least one display object is farther away from the eyes, the visual perception in the depth direction of the eyes caused by closer display of the at least one display object is relieved to certain extent or even offset, thereby the visual discomfort possibly caused by adjusting of the display image distance is relieved or even eliminated, and it is further favorable for improving visual effect and user experience.

In combination with any display control method provided by the embodiment of the present application, optionally, the method also comprises: determining a zooming ratio parameter of the at least one display object according to the display image distances before and after the at least one display object is adjusted. Correspondingly, the controlling the display device to display the at least one display object in a zooming manner according to the adjusted display image distance, comprises: controlling the display device to display the at least one display object according to the adjusted display image distance and the zooming ratio parameter. In the solution, the corresponding zooming ratio parameter is determined in combination with the display image distances before and after the at least one display object is adjusted, and zooming display control is performed accordingly, thereby the visual discomfort possibly caused by the adjusting of the display image distance is relieved or even eliminated, and it is favorable for improving visual effect and user experience.

A display pixel pitch of the display device is assumed as $p_d$, the distance between the image of certain object displayed through the display device in space and the eyes is $d_{o1}$, the magnifying times of the same display pixels on the plane of the image is $M_1$, if the number of display pixels corresponding to the display object is $S_1$, then for a user, in order to ensure the consistent-sized images of the same object of different distances (namely different display image distances) in the depth direction on retinas of the eyes, it needs to satisfy:

$$p_d S_1 M_1 = p_d S_2 M_2 \quad (7)$$

wherein, $$M_1 = 1 + \frac{d_{o1} - d_e}{f_1}, M_2 = 1 + \frac{d_{o2} - d_e}{f_2};$$

$S_2$ is the number of the display pixels corresponding to the display object after the display image distance is adjusted, the magnifying times of the same display pixels on the plane of the image of the display object after the display image distance is adjusted is $M_2$. Through formula transformation, a zooming ratio parameter $R_m$ is:

$$R_m = \frac{s_2}{s_1} = \frac{f_2(f_1 + d_{o1} - d_e)}{f_1(f_2 + d_{o2} - d_e)} \quad (8)$$

By adopting such solution to determine the zooming ratio parameter to compensate with a user visual effect of the user caused by the adjusting of the display image distance of the display object, the visual perception of the user in the depth direction possibly caused by the adjusting of the display image distance is favorably relieved or eliminated, and thereby it is favorable for improving visual effect and user experience.

The technical solution provided by the embodiment of the present application is used in but not limited to applications of 2D display, 3D display, light field display, virtual reality display or reality-augmented display. For example, in the reality-augmented display application, the at least one display object displayed by the display device is overlapped with a real object in a real scene, a virtual-real fusion reality-augmented display effect can be realized, and the display device can comprise glasses, a helmet and other near-to-eye display devices.

When the head of a user wearing the near-to-eye display device turns, the near-to-eye display device accordingly rotates along with same, by adopting a technical solution provided by the embodiment of the present application, the display image distance of the at least one display object as the virtual content can be adjusted according to movement information of the near-to-eye display device, for example, the display image distance is increased to display the at least one display object in a farther manner, thereby, visual discomfort such as image judder or trailing possibly caused by movement of the near-to-eye device is relieved as mush possible or even eliminated.

In combination with any display control method provided by the embodiment of the present application, optionally, the display control method also comprises: according to the display image distance before adjusting, determining relative blocking information in the depth direction corresponding to the adjusted display image distance of the at least one display object and other objects; in this situation, the controlling the display device to display the at least one display object according to the adjusted display image distance, comprises: controlling the display device to display the at least one display object according to the adjusted display image distance and the relative blocking information. This solution can keep the visual perception of a relative position relation of the at least one display object and other objects after the display image distance is adjusted unchanged. Optionally, the other objects can be displayed display objects, in this situation, these display objects can be displayed in a farther manner according to the relative blocking information of the at least one display object and the other objects, to keep the visual perception of a relative position relation of these display objects unchanged. In addition, optionally, the other objects can be real objects presented by the at least one display object in a real environment, in order to keep the visual perception of the relative position relation of a virtual image of the at least one display object and the real object in the real environment unchanged, for example, the virtual image is displayed in front of the real object, in this situation, after being at a farther position, the virtual image is possibly positioned behind the real object, in order to create a visual effect that the farther virtual image is still positioned in front of the real object, the relative blocking information of the depth direction corresponding to the adjusted display image distance of the at least one display object and the real object is determined according to the display image distance before adjusting, the display device is controlled to display the at least one display object according to the adjusted display image distance and the relative blocking information, for example, for the relative blocking information that the virtual image is in front of the real object, the virtual image can be wholly displayed in the real environment, namely a part, not overlapped with the real object, of the virtual image and a part, overlapped with the real object, of the virtual image are both displayed, in this way, it seems that the real object is partially blocked by the virtual image from vision, thereby the real object is visually partially blocked by the virtual image, and the user feels the visual perception that the virtual image is positioned in front of the real object.

According to the technical solution provided by the embodiment of the present application, the display device comprises but is not limited to a light field display, a near-to-eye display, a 3D display, a projection display, a binocular display device and the like, which is not limited by the embodiment of the present application. For the binocular display device, an imaging depth is felt by binary disparity of left and right eyes, thereby the user experiences a stereoscopic imaging effect. In the situation that the technical solution provided by the embodiment of the present application is realized based on the binocular display device, the controlling the display device to display the at least one display object according to the adjusted display image distance, comprises: adjusting the left and right eye disparity of the at least one display object displayed by the binocular display device according to the adjusted display image distance; and controlling the binocular display device to display the at least one display object according to the adjusted display image distance and the adjusted left and right eye disparity. In the solution, the at least one display object is displayed in a farther manner, which is favorable for relieving or eliminating the visual perception of the eyes such as imaging judder and trialing of the display object caused by the movement information of the binocular display device; and/or the at least one display object is displayed at a closer manner by adopting this solution, which is favorable for enhancing an immersive visual effect of the user. For the adjusting of the display image distance of certain display object, if the original binary disparity of the display object is not adaptively adjusted, visual discomfort of the eyes may be caused due to larger difference between a binocular real accommodation distance and a convergence distance, therefore, in the solution, the original binary disparity of the display object can be adaptively adjusted according to the adjusted display image distance thereby, the visual discomfort brought to the user caused by the larger difference between the binocular real accommodation distance and the convergence distance due to display image distance adjusting is reduced as much as possible, and visual effect and user experience are improved, wherein, the adjusted binary disparity can be determined by but is not limited following manners:

$$d = \frac{fB}{Z_c} \quad (9)$$

wherein, d is the adjusted binary disparity, f is an equivalent focus length, B is the distance of centers of a left display and a right display of the binocular display device, and $Z_c$ is the binocular convergence distance corresponding to the adjusted display image distance of the display object, wherein, $$\left|\frac{1}{Z_d} - \frac{1}{Z_c}\right| \leq n, \frac{1}{3} \leq n \leq \frac{2}{3} \quad (10)$$

$Z_d$ is the adjusted display image distance of the display object. The solution is simple and easy to realize, and is favorable for acquiring a better visual effect.

Further, before the adjusting of the binocular disparity, the method also comprises: determining whether the adjusting of the binary disparity is required according to the adjusted display image distance of the display object and the binocular convergence distance corresponding to the binary disparity before adjusting of the display object, for example, a triggering judgment of binocular disparity adjusting can be performed based on a following formula:

$$\left|\frac{1}{Z_d} - \frac{1}{Z_c'}\right| \leq n, \frac{1}{3} \leq n \leq \frac{2}{3} \quad (11)$$

$Z_c'$ is a known binocular convergence distance corresponding to the binary disparity before adjusting of the display object. If the formula (11) holds, it is indicated that the difference between focusing and the convergence distance caused by the adjusting of the display image distance of the display object falls in an allowable range of the eyes, and in this situation, adaptive adjusting of the binary disparity may not be performed to reduce the complexity of the solution as much as possible on the basis of realizing a better visual effect, if formula (11) does not hold, it is indicated that the adjusting of the display image distance of the display object may cause an uncomfortable viewing experience, this situation can trigger the adjusting of the binary disparity, for example, the binary disparity (namely the adjusted binocular disparity d) corresponding to the adjusted display image distance can be determined by formulas (10) and (9). In practical application, n is any number meeting the condition of $$\frac{1}{3} \leq n \leq \frac{2}{3},$$

and an implementation is flexible. Further, n can also be determined according to duration of display time of the display object, for example, $$n = \frac{1}{3}$$

so as to meet a diopter law to be met by the binocular 3D display, if the display time is shorter, then n can be increased, for example, $$n = \frac{2}{3},$$

etc.

It may be understood by a person skilled in the art that, in any one of the foregoing methods of example embodiments of the present application, the value of the serial number of each step described above does not mean an execution sequence, and the execution sequence of the steps should be determined according to the function and internal logical thereof, and should not constitute any limitation to the implementation procedure of the example embodiments of the present application.

Figure 2:
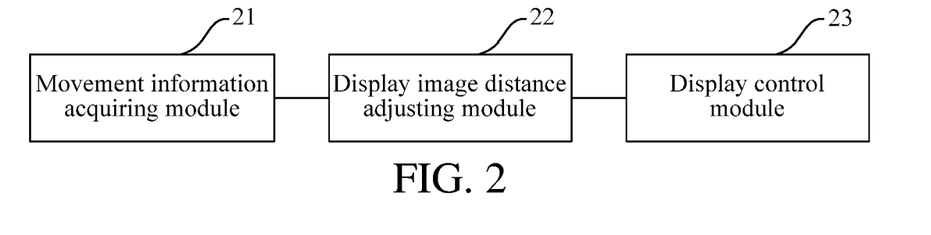
FIG. 2 is a logical block diagram of a first display control apparatus according to an example embodiment of the present application.

FIG. 2 is a logical block diagram of a display control apparatus according to an embodiment of the present application. As shown in the figure, the display control apparatus provided by the embodiment of the present application comprises: a movement information acquiring module 21, a display image distance adjusting module 22 and a first display control module 23.

The movement information acquiring module 21 is configured to acquire movement information of one display device.

The display image distance adjusting module 22 is configured to adjust a display image distance of at least one display object according to the movement information.

The display control module 23 is configured to control the display device to display the at least one display object at least according to the adjusted display image distance.

According to the technical solutions provided by embodiments of the present application, a display image distance of at least one display object can be adjusted according to movement information of the display device, and the display device is controlled to display the at least one display object at least according to the adjusted display image distance, thereby the movement information of the display device is adaptively adjusted according to the display image distance of at least one display object, and a visual effect and user experience are improved.

There is no limit to the manners in which the display control apparatus is embodied. For example, the display control apparatus may be an independent part, and the part cooperates with a display device in communication; or the display control apparatus may be a functional module integrated in a display device, which is not limited in this embodiment of the present application.

Optionally, the movement information comprises: absolute movement information of the display device, or the movement information comprises: the movement information of the display device relative to the at least one display object. A manner for acquiring the movement information of the display device is very flexible, for example, the movement information can be acquired by detection of the display device per se, or the movement information can be acquired by other devices communicated with the display device, which is not limited in the embodiment of the present application.

After the movement information of the display device is acquired, a display image distance of the at least one display object can be adjusted according to the movement information, the adjusting of the display image distance comprises but is not limited to increasing or reducing of the original display image distance to meet diversified practical application requirements.

Figure 3:
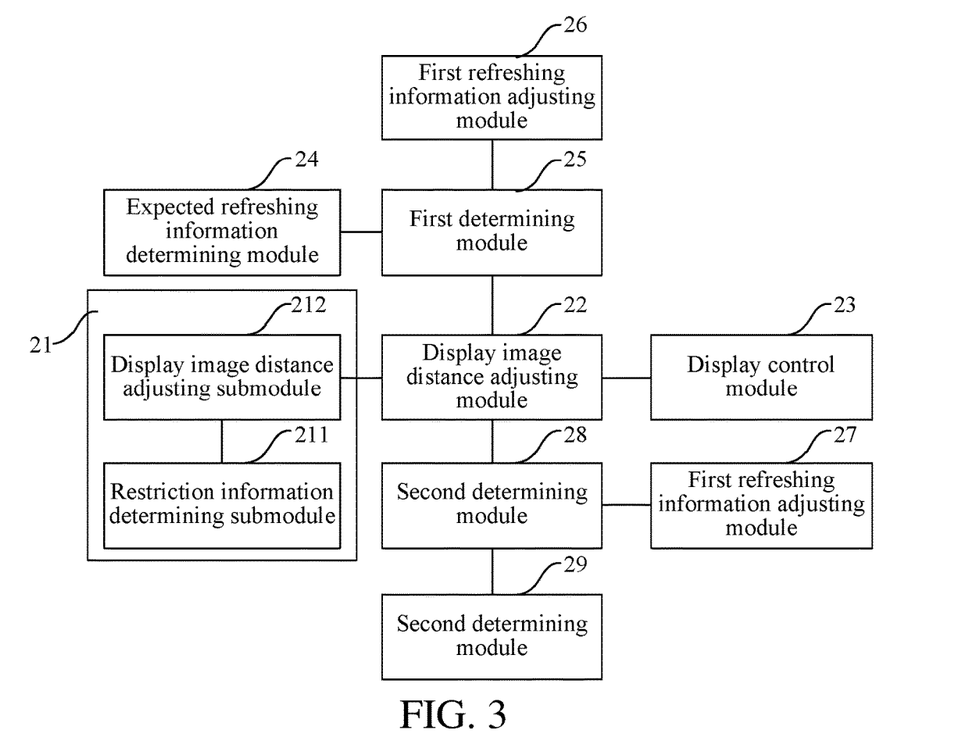
FIG. 3 is a logical block diagram of a second display control apparatus according to an example embodiment of the present application.

Optionally, as shown in FIG. 3, the display image distance adjusting module 21 comprises: a restriction information determining submodule 211 and a display image distance adjusting submodule 212. The restriction information determining submodule 211 is configured to determine the restriction information of the display image distance according to the movement information and refreshing capability information of the display device; the display image distance adjusting submodule 212 is configured to adjust the display image distance of the at least one display object according to the restriction information of the display image distance. In the solution, the movement information and refreshing capability information of the display device are combined to dynamically adapt to the display image distance of the at least one display object, and improve adjusting pertinence and effectiveness of the display image distance.

Optionally, the display control apparatus also comprises an expected refreshing information determining module 24 and a first determining module 25. The expected refreshing information determining module 24 is configured to determine the expected refreshing information of the display device corresponding to the movement information; and the first determining module 25 is configured to determine the expected refreshing information to exceed the refreshing capability information of the display device, and enable the display image distance adjusting module according to a determining result. The solution is equivalent to determination of weakening or offsetting the refreshing information (namely expected refreshing information) of the display device required for eye discomfort possibly generated by movement information of the display device, which is used as a triggering factor for adjusting the display image distance or not. If the expected refreshing information exceeds the refreshing capability information of the display device, it is indicted to certain extent that the display device incompetently supports smooth display of the at least one display object during relative movement, in the situation, the display image distance of the at least one display object is correspondingly adjusted according to the movement information, and corresponding display control is performed to relieve to certain extent or eliminate visual discomfort of the eyes, and improve a viewing effect and user experience.

Optionally, the display control apparatus also comprises: a first refreshing information adjusting module 26. The first refreshing information adjusting module 26 is configured to respond to the expected refreshing information to not exceed the refreshing capability information of the display device, and adjust the refreshing information of the display device according to the refreshing capability information and the expected refreshing information. In the solution, the refreshing rate of the display device is simply adjusted within the refreshing capability range of the display device to meet the application requirement on smooth display of the at least one display object relative to eye vision, the discomfort of the eyes is relieved to certain extent or even eliminated, a viewing effect and user experience are improved, the solution is simple and easy to realize and solution universality is improved.

Optionally, the display control apparatus also comprises: an allowable movement information determining module 27 and a second determining module 28. The allowable movement information determining module 27 is configured to determine allowable movement information corresponding to the refreshing capability of the display device; the second determining module 28 is configured to determine the movement information to exceed the allowable movement information and enable the display image distance adjusting module according to a determining result. The solution is equivalent to determination of the allowable movement information of the display device, not causing obvious discomfort to eye vision, supported by the refreshing capability information of the display device, which is used as a triggering factor of adjusting the display image distance or not. If the movement information of the display device exceeds the allowable movement information, it is indicated to certain extent that the display device incompetently supports the smooth display of the at least one display object during relative movement, in this situation, the display image distance of the at least one display object is correspondingly adjusted according to the movement information, and corresponding display control is performed to relieve to certain extent or even eliminate visual discomfort of the eyes, and improve a viewing effect and user experience.

Optionally, the display control apparatus also comprises: a second refreshing information adjusting module 29. The second refreshing information adjusting module 29 is configured to respond to the movement information to not exceed the allowable movement information and adjust the refreshing information of the display device according to the refreshing capability information. In the solution, the refreshing rate of the display device is simply adjusted within the refreshing capability range of the display device to meet the application requirement on smooth display of the at least one display object relative to eye vision, the discomfort of the eyes is relieved to certain extent or even eliminated, a viewing effect and user experience are improved, the solution is simple and easy to realize and solution universality is improved.

Figure 4:
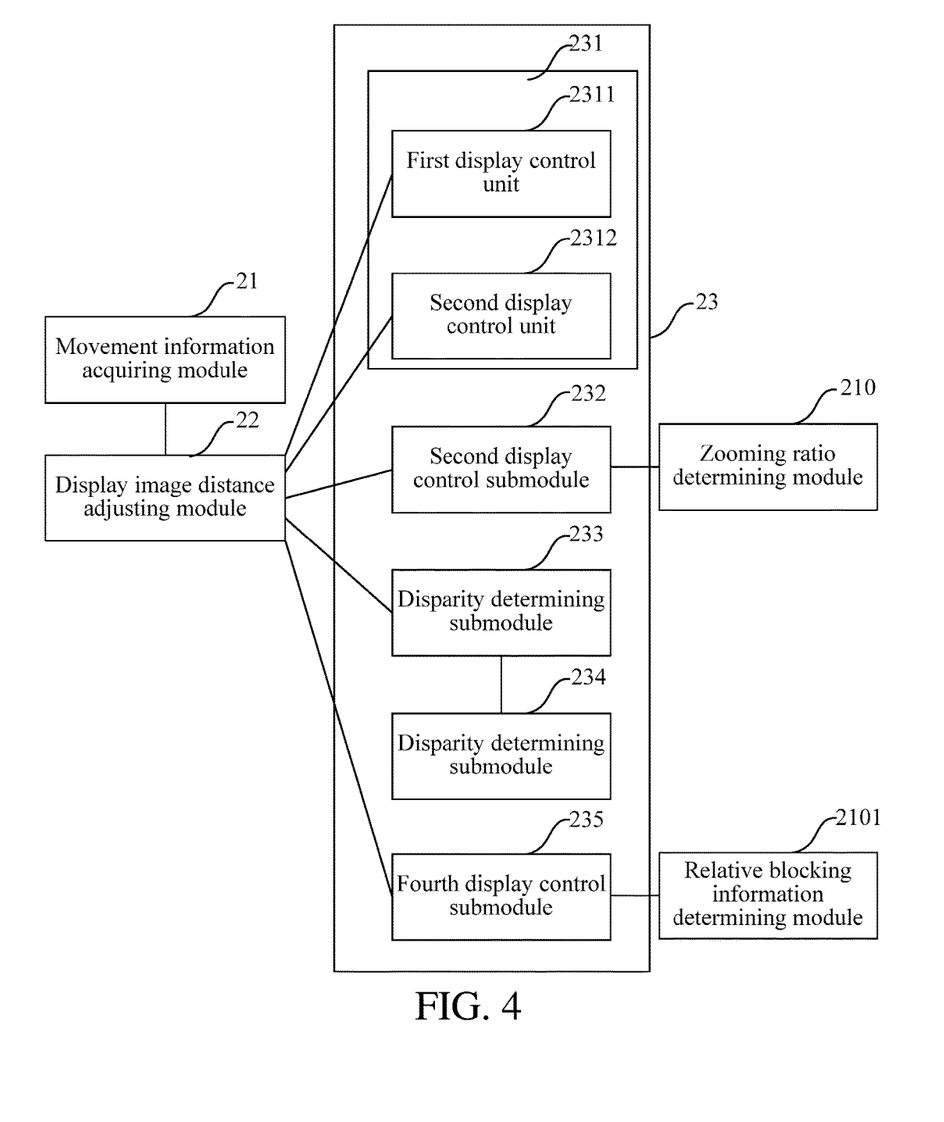
FIG. 4 is a logical block diagram of a third display control apparatus according to an example embodiment of the present application.

Optionally, as shown in FIG. 4, the display control module 23 comprises: a first display control submodule 231. The first display control submodule 231 is configured to control the display device to display the at least one display object in a zooming manner according the adjusted display image distance. In the solution, the adjusting of the display image distance in a depth direction and the zooming display of the display object are combined, which is favorable for fully using eye visual characteristics to weaken as much as possible or eliminate visual discomfort of the eyes caused by display change in the depth direction.

Optionally, the display image distance after the display object is adjusted is larger than the display image distance before the display object is adjusted. In the solution, by a manner of farther display of the at least one display object, the eye visual discomfort possibly caused by movement information of the display device is weakened or even offset. Further optionally, the first display control submodule 231 comprises: a first display control unit 2311. The first display control unit 2311 is configured to control the display device to display the at least one display object in a zooming in manner according to the adjusted display image distance. In the solution, the visual perception in the depth direction of the eyes caused by farther display of the at least one display object is relieved to certain extent or even offset, thereby the visual discomfort possibly caused by adjusting of the display image distance is relieved or even eliminated, and it is further favorable for improving visual effect and user experience.

Optionally, the display image distance after the display object is adjusted is smaller than the display image distance before the display object is adjusted. In the solution, by a manner of closer display of the at least one display object, a visual immersion of the content displayed by the display device is increased, and a visual effect and user experience are improved. Further optionally, the first display control submodule 231 comprises: a second display control unit 2312. The second display control unit 2312 is configured to control the display device to display the at least one display object in a zooming out manner according to the adjusted display image distance. In the solution, the visual perception in the depth direction of the eyes caused by closer display of the at least one display object is relieved to certain extent or even offset, thereby the visual discomfort possibly caused by adjusting of the display image distance is relieved or even eliminated, and it is further favorable for improving visual effect and user experience.

Optionally, the display control apparatus also comprises: a zooming ratio determining module 210, the zooming ratio determining module 210 is configured to determine a zooming ratio parameter of the at least one display object according to the display image distances before and after the at least one display object is adjusted. In the situation, the display control module 23 comprises: a second display control submodule 232, the second display control submodule 232 is configured to control the display device to display the at least one display object according to the adjusted display image distance and the zooming ratio parameter. In the solution, the corresponding zooming ratio parameter is determined in combination with the display image distances before and after the at least one display object is displayed, and zooming display control is performed accordingly, thereby the visual discomfort possibly caused by the adjusting of the display image distance is relieved or even eliminated, and it is favorable for improving visual effect and user experience.

Optionally, the display device comprises: a binocular display device; the display control module 23 comprises: a disparity determining submodule 233 and a third display control submodule 234. The disparity determining submodule 233 is configured to adjust the left and right eye disparity of the at least one display object displayed by the binocular display device according to the adjusted display image distance; the third display control submodule 234 is configured to control the binocular display device to display the at least one display object according to the adjusted display image distance and the adjusted left and right eye disparity. In the solution, the at least one display object is displayed in a farther manner, which is favorable for relieving or eliminating the visual perception of the eyes such as imaging judder and trialing of the display object caused by the movement information of the binocular display device; and/or the at least one display object is displayed at a closer manner by adopting the solution, which is favorable for enhancing an immersive visual effect of the user.

Optionally, the display control apparatus also comprises a relative blocking information determining module 2101, and the display control module 23 also comprises a fourth display control submodule 235. The relative blocking information determining module 2101 is configured to determine relative blocking information in the depth direction corresponding to the adjusted display image distance of the at least one display object and other objects according to the display image distance before adjusting; the fourth display control submodule 235 is configured to control the display device to display the at least one display object according to the adjusted display image distance and the relative blocking information. This solution can keep the visual perception of a relative position relation of the at least one display object and other objects after the display image distance is adjusted unchanged.

Figure 5:
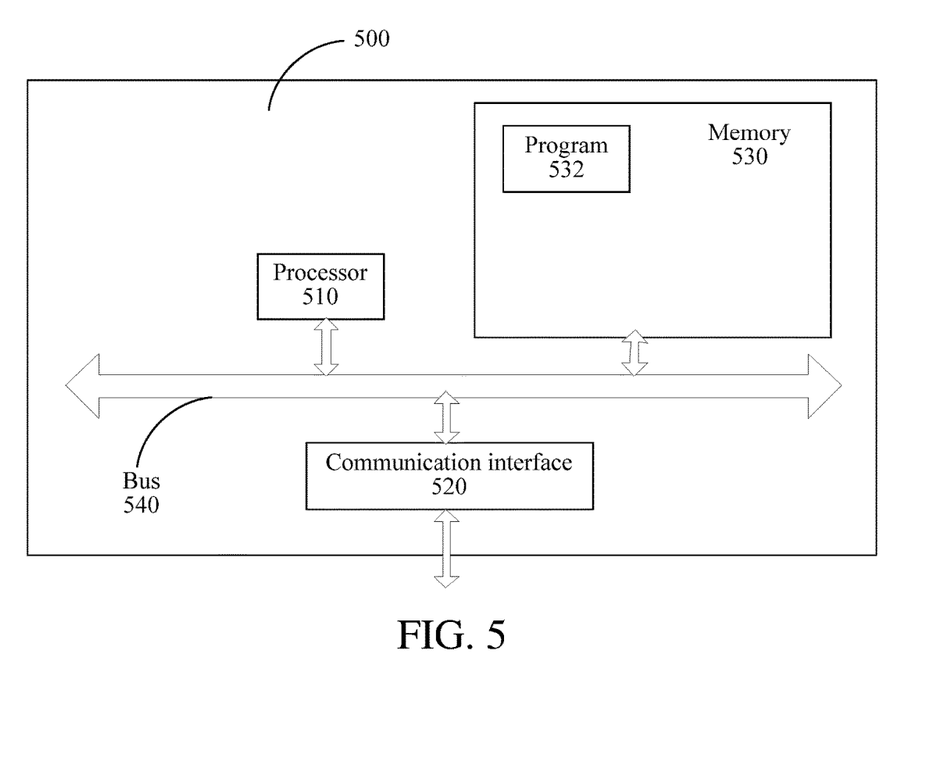
FIG. 5 is a logical block diagram of a display device according to an example embodiment of the present application.

FIG. 5 is a structural block diagram of a display device according to an embodiment of the present application, and an example embodiment of the display control device 500 is not limited by a specific embodiment of the present application. As shown in FIG. 5, the display device 500 may comprise:

a processor 510, a communication interface 520, a memory 530 and a communication bus 540, wherein, the processor 510, the communication interface 520, and the memory 530 communicate with one another by the communication bus 540.

The communication interface 520 is configured to communicate with an external device with a communication function.

The processor 510 is configured to execute a program 532, which specifically executes related steps in the embodiments of any method.

For example, the program 532 may comprise a program code, and the program code comprises at least one computer operation command.

The processor 510 may be a central processing unit (CPU), or an application specific integrated circuit (ASIC) or configured to implement one or more integrated circuits of the embodiments of the present application.

The memory 530 is configured to store the program 532. The memory 530 may comprise a random access memory (RAM), and may also comprise a non-volatile memory, such as at least one disk memory. For example, in one example embodiment, the processor 510 can execute the following steps by executing the program 532: acquiring movement information of a display device; adjusting a display image distance of at least one display object according to the movement information; and controlling the display device to display the at least one display object at least according to the adjusted display image distance. In other example embodiments, the processor 510 can execute the steps mentioned in any other embodiment by executing the program 532, which is not repeated herein.

Specific implementation of each step in the program 532 refers to the corresponding description of corresponding steps, modules, submodules and units in foregoing embodiments, which is not repeated herein. A person of ordinary skill in the art can clearly understand that for convenient and brief description, a specific work process of the foregoing devices and modules may refer to the corresponding process description in the embodiments of the methods, which is not repeated herein.

In the foregoing embodiments of the present application, the serial number and/or sequence of the embodiments are only intended for the convenience of description, and do not represent inferiority or superiority of the embodiments. The description of each embodiment has a different focus. For any part of an embodiment not described in details, refer to relevant description of another embodiment. For relevant description of the implementation principle or process of apparatus, device or system embodiments, refer to records of relevant method embodiments, and the details are not described herein again.

A person of ordinary skill in the art may recognize that, the units, methods and procedures of each example described with reference to the embodiments disclosed herein, can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or a part thereof contributing to the existing art, or a part of the technical solutions may be implemented in the form of a software product. The computer software product is stored in a storage medium and comprises several instructions for instructing a computer device (which may be a personal computer, a server, a network device, or the like) to perform all or some of the steps of the display control methods in the embodiments of the present application. The foregoing storage medium comprises: any medium that can store program code, such as a USB flash drive, a removable hard disk, a read-only memory (ROM for short), a random access memory (RAM for short), a magnetic disk, or an optical disc.

In the apparatus, method and system embodiments of the present application, apparently, each component (such as a system, a sub-system, a module, a sub-module, a unit, and a sub-unit) or each step may be decomposed, combined and/or recombined after decomposition. Such decomposition and/or recombination shall be considered as an equivalent solution of the present application. In addition, in the above description of specific embodiments of the present application, a feature described and/or shown in one example embodiment may be used in one or more other example embodiments by using a same or similar manner, combined with a feature of another example embodiment, or replace a feature of another example embodiment.

It should be emphasized that, the term "comprise" used herein refers to existence of a feature, an element, a step or a component, but does not exclude existence or addition of one or more other features, elements, steps or components.

Finally, it should be noted that, the above example embodiments are only used to describe the present application, rather than limit the present application. Various alterations and variants may also be made by a person of ordinary skill in the art without departing from the spirit and scope of the present application. Therefore, all equivalent technical solutions also belong to the scope of the present application, and the patent protection scope of the present application should be subject to the claims.

What is claimed is:

1. A method, comprising:
acquiring, by a system comprising a processor, movement information of a display device;
adjusting a display image distance of at least one display object according to the movement information resulting in an adjusted display image distance, wherein the display image distance is a distance of an image displayed by an optical part of the display device and the optical part; and
controlling the display device to display the at least one display object at least according to the adjusted display image distance,
wherein the adjusting the display image distance comprises:
determining display image distance restriction information according to the movement information and refreshing capability information of the display device, and
adjusting the display image distance of the at least one display object according to the display image distance restriction information.

2. The method of claim 1, wherein the movement information comprises: absolute movement information of the display device.

3. The method of claim 1, wherein the movement information comprises: movement information of the display device relative to the at least one display object.

4. The method of claim 1, further comprising:
before the adjusting the display image distance, determining expected refreshing information of the display device corresponding to the movement information; and
determining whether the expected refreshing information exceeds the refreshing capability information of the display device.

5. The method of claim 4, further comprising:
responding to the expected refreshing information being determined not to exceed the refreshing capability information of the display device; and
adjusting refreshing information of the display device according to the refreshing capability information and the expected refreshing information.

6. The method of claim 1, further comprising:
before the adjusting the display image distance, determining allowable movement information corresponding to the refreshing capability information of the display device; and
determining whether the movement information exceeds the allowable movement information.

7. The method of claim 6, further comprising:
responding to the movement information being determined not to exceed the allowable movement information; and
adjusting refreshing information of the display device according to the refreshing capability information.

8. The method of claim 1, wherein the controlling the display device to display the at least one display object at least according to the adjusted display image distance comprises:

controlling the display device to display the at least one display object according to a zooming function based on the adjusted display image distance.

9. The method of claim 1, wherein the adjusted display image distance after the display object is adjusted is larger than the display image distance before the display object is adjusted.

10. The method of claim 9, wherein the controlling the display device to display the at least one display object in a zooming manner according to the adjusted display image distance comprises:
controlling the display device to display the at least one display object according to a zooming function based on the adjusted display image distance.

11. The method of claim 10, wherein the display device comprises: a binocular display device, and wherein the controlling the display device to display the at least one display object at least according to the adjusted display image distance comprises:
adjusting a left and right eye disparity of the at least one display object displayed by the binocular display device according to the adjusted display image distance resulting in an adjusted left and right eye disparity; and
controlling the binocular display device to display the at least one display object according to the adjusted display image distance and the adjusted left and right eye disparity.

12. The method of claim 1, wherein the adjusted display image distance after the display object is adjusted is smaller than the display image distance before the display object is adjusted.

13. The method of claim 12, wherein the controlling the display device to display the at least one display object according to a zooming function based on the adjusted display image distance comprises:
controlling the display device to display the at least one display object according to a zooming out function based on the adjusted display image distance.

14. The method of claim 1, further comprising:
determining a zooming ratio parameter of the at least one display object according to the display image distance before, and the adjusted image distance after, the at least one display object is adjusted,
wherein the controlling the display device to display the at least one display object comprises controlling the display device to display the at least one display object in a zooming manner at least according to the adjusted display image distance and the zooming ratio parameter.

15. The method of claim 1, further comprising:
according to the display image distance before adjusting, determining relative blocking information in a depth direction corresponding to the adjusted display image distance of the at least one display object and other objects,
wherein the controlling the display device to display the at least one display object at least according to the adjusted display image distance comprises: controlling the display device to display the at least one display object according to the adjusted display image distance and the relative blocking information.

16. An apparatus, comprising:
a memory that stores executable modules; and
a processor, coupled to the memory, that executes or facilitates execution of the executable modules, the executable modules comprising:
a movement information acquiring module configured to acquire movement information of a display device;
a display image distance adjusting module configured to adjust a display image distance of at least one display object according to the movement information resulting in an adjusted display image distance, wherein the display image distance is a distance of an image displayed by an optical part of the display device and the optical part; and
a display control module configured to control the display device to display the at least one display object at least according to the adjusted display image distance,
wherein the display image distance adjusting module comprises:
a restriction information determining submodule configured to determine display image distance restriction information according to the movement information and refreshing capability information of the display device, and
a display image distance adjusting submodule configured to adjust the display image distance of the at least one display object according to the display image distance restriction information.

17. The apparatus of claim 16, wherein the movement information comprises: absolute movement information of the display device.

18. The apparatus of claim 16, wherein the movement information comprises: movement information of the display device relative to the at least one display object.

19. The apparatus of claim 16, wherein the executable modules further comprise:
an expected refreshing information determining module configured to determine expected refreshing information of the display device corresponding to the movement information; and
a first determining module configured to determine whether the expected refreshing information to exceed the refreshing capability information of the display device, and enable a display image distance adjusting module to adjust the display image distance of the at least one display object.

20. The apparatus of claim 19, wherein the executable modules further comprise:
a first refreshing information adjusting module configured to respond to the expected refreshing information being determined not to exceed the refreshing capability information of the display device, and adjust refreshing information of the display device according to the refreshing capability information and the expected refreshing information.

21. The apparatus of claim 16, wherein the executable modules further comprise:
an allowable movement information determining module configured to determine allowable movement information corresponding to a refreshing capability of the display device; and
a second determining module configured to determine the movement information to exceed the allowable movement information and enable a display image distance adjusting module to adjust the display image distance of the at least one display object according to a determining result.

22. The apparatus of claim 21, wherein the executable modules further comprise:
a second refreshing information adjusting module configured to respond to the movement information being determined not to exceed the allowable movement information and adjust refreshing information of the display device according to the refreshing capability information of the display device.

23. The apparatus of claim 16, wherein the display control module comprises:
a first display control submodule configured to control the display device to display the at least one display object in a zooming manner according to the adjusted display image distance.

24. The apparatus of claim 16, wherein the adjusted display image distance is larger than the display image distance.

25. The apparatus of claim 24, wherein the first display control submodule comprises:
a first display control unit configured to control the display device to display the at least one display object in a zooming manner according to the adjusted display image distance.

26. The apparatus of claim 16, wherein the adjusted display image distance is smaller than the display image distance.

27. The apparatus of claim 26, wherein the first display control submodule comprises:
a second display control unit configured to control the display device to display the at least one display object in a zooming out manner according to the adjusted display image distance.

28. The apparatus of claim 16, wherein the executable modules further comprise:
a zooming ratio determining module configured to determine a zooming ratio parameter of the at least one display object according to the display image distances before and after the at least one display object is adjusted, and
wherein the display control module comprises: a second display control submodule configured to control the display device to display the at least one display object according to the adjusted display image distance and the zooming ratio parameter.

29. The apparatus of claim 16, wherein the display device comprises: a binocular display device, and wherein the display control module comprises:
a disparity determining submodule configured to adjust a left and right eye disparity of the at least one display object displayed by the binocular display device according to the adjusted display image distance resulting in an adjusted left and right eye disparity; and
a third display control submodule configured to control the binocular display device to display the at least one display object according to the adjusted display image distance and the adjusted left and right eye disparity.

30. The apparatus of claim 16, wherein the executable modules further comprise:
a relative blocking information determining module configured to determine relative blocking information in a depth direction corresponding to the adjusted display image distance of the at least one display object and other objects according to the display image distance before adjusting and
wherein the display control module comprises: a fourth display control submodule configured to control the display device to display the at least one display object according to the adjusted display image distance and the relative blocking information.

31. A device, comprising:
a processor, a communication interface, a memory and a communication bus; the processor, the communication interface, and the memory communicate with one another via the communication bus;
the memory is configured to store at least one command; and the command causes the processor to execute operations, comprising:
acquiring movement information of a display device;
adjusting a display image distance of a display object according to the movement information resulting in an adjusted display image distance, wherein the display image distance is a distance of an image displayed by an optical part of the display device and the optical part; and
controlling the display device to display the display object at least according to the adjusted display image distance,
wherein the adjusting the display image distance comprises:
determining display image distance restriction information according to the movement information and refreshing capability information of the display device, and
adjusting the display image distance of the display object according to the display image distance restriction information.

32. The device of claim 31, wherein the operations further comprise:
before the adjusting the display image distance, determining expected refreshing information of the display device corresponding to the movement information; and
determining whether the expected refreshing information exceeds the refreshing capability information of the display device.

33. A non-transitory computer-readable storage apparatus, comprising at least one executable instruction, which, in response to execution, causes a system comprising a processor to perform operations, comprising:
acquiring movement information of a display device;
adjusting a display image distance of a display object according to the movement information resulting in an adjusted display image distance, wherein the display image distance is a distance of an image displayed by an optical part of the display device and the optical part; and
controlling the display device to display the display object at least according to the modified display image distance,
wherein the adjusting the display image distance comprises:
determining display image distance restriction information according to the movement information and refreshing capability information of the display device, and
adjusting the display image distance of the display object according to the display image distance restriction information.

34. The non-transitory computer-readable storage apparatus of claim 33, wherein the operations further comprise:
before the adjusting the display image distance, determining expected refreshing information of the display device corresponding to the movement information; and
determining whether the expected refreshing information exceeds the refreshing capability information of the display device.

* * * * *